(No Model.)
D. B. STEVENSON.
DEEP WELL PUMP.
No. 529,209. Patented Nov. 13, 1894.
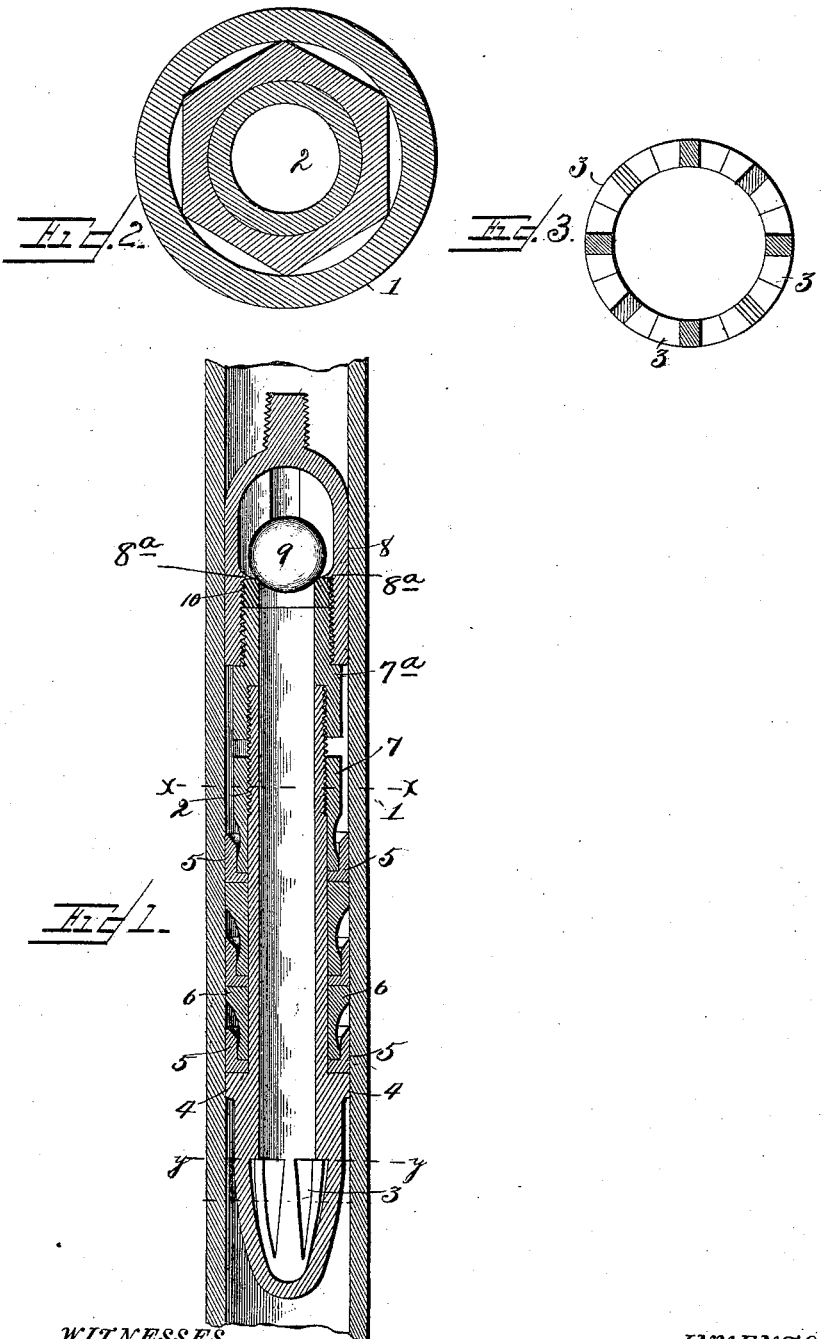
WITNESSES
INVENTOR:
David B. Stevenson

UNITED STATES PATENT OFFICE.

DAVID BOWLBY STEVENSON, OF PETROLIA, PENNSYLVANIA.

DEEP-WELL PUMP.

SPECIFICATION forming part of Letters Patent No. 529,209, dated November 13, 1894.

Application filed February 4, 1893. Serial No. 460,992. (No model.)

*To all whom it may concern:*

Be it known that I, DAVID BOWLBY STEVENSON, a citizen of the United States, and a resident of Petrolia, in the county of Butler and State of Pennsylvania, have invented certain new and useful Improvements in Deep-Well Pumps; and I do hereby declare that the following is a full, clear, and exact description of the invention, which will enable others skilled in the art to which it appertains to make and use the same, reference being had to the accompanying drawings, which form a part of this specification.

My invention relates to improvements in oil and other deep well pumps, and it consists in the novel construction and combination of parts hereinafter fully described and claimed.

In the accompanying drawings: Figure 1 is a sectional elevation of a portion of a pump constructed in accordance with my invention. Fig. 2 is a horizontal section on the line $x-x$ Fig. 1. Fig. 3 is a similar view on the line $y-y$.

In the said drawings the reference numeral 1 designates the pump-barrel or tubular lining of an oil or other well in which the hollow piston 2, connected at its upper end with the pump rod reciprocates. The lower end of this valve is formed into a point and is provided with a series of V-shaped openings 3, intended for the passage of the oil and other liquid. A short distance above its lower end the piston 2 is provided with a peripheral flange or shoulder 4 for supporting the lower packing cup 5, and above this cup is a ring 6, which rests upon the bottom of said cup and holds it in place. The packing cups are made of leather or other suitable material, and the rings of metal, and any number thereof, superimposed one upon the other may be employed as found convenient or desirable.

At its upper end the piston is screw-threaded externally to receive a follower 7, consisting of a metal sleeve screw-threaded internally to correspond with the threads on the piston, the lower end of which bears upon the upper packing cup, whereby all of said cups and their rings are securely held and prevented from working loose.

The numeral $7^a$ designates a coupling formed with interior screw threads at its lower end by which it is secured to the upper end of the piston 2, and at its upper end is provided with exterior screw threads to receive a cage 8, formed with apertures for the escape of liquid from the working piston. This cage is provided with a ball-valve 9, which seats upon an annular ring 10.

The cage, intermediate of its ends at the point of termination of the screw threads, is formed with an interior annular flange $8^a$, which bears against the upper end of ring 10 and holds it in place on its seat.

It will be noted that the point of the piston and the shoulder 4, is made integral or in one piece with the remaining portion thereof, so that there is no liability of the same working loose as is often the case when made separate and screwed thereon.

It will be seen that the cups and rings can be readily tightened by screwing down the follower, by means of a wrench, the periphery being made polygonal, as seen in Fig. 4, for such purpose. The operation of the pump will be readily understood by those skilled in the art.

Having thus described my invention, what I claim is—

In a deep well pump, the combination with the pump barrel or tube, of the vertically reciprocating hollow piston, screw threaded at its upper end and pointed and formed with openings at its lower end and with a peripheral flange above said openings, the superimposed packing cups and rings, the screw threaded follower, the interiorly and exteriorly screw threaded coupling fitting on the upper end of the hollow piston, the interiorly screw threaded apertured cage having an interior annular flange intermediate its ends, the packing ring confined between said flange and the upper end of the coupling, and the ball valve located in said cage, substantially as described.

In testimony that I claim the foregoing as my own I have hereunto affixed my signature in presence of two witnesses.

DAVID BOWLBY STEVENSON.

Witnesses:
DANIEL C. KEIGHRON,
GEORGE W. STOREY.